(12) United States Patent
Meyberg et al.

(10) Patent No.: US 7,052,281 B1
(45) Date of Patent: May 30, 2006

(54) CABLE WINDING DEVICE WITH DIRECT CABLE TO ELECTRICAL COMPONENT CONNECTION

(75) Inventors: Jacob T. Meyberg, Santa Cruz, CA (US); Edward O. Sanderson, Capitola, CA (US); Gary T. Brint, Scotts Valley, CA (US); Alan W. Grattan, Santa Cruz, CA (US); Eric R. Bradford, Campbell, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 10/952,661

(22) Filed: Sep. 29, 2004

(51) Int. Cl.
    *H01R 39/00* (2006.01)
(52) U.S. Cl. .......................... 439/4; 439/501
(58) Field of Classification Search ............. 439/4, 439/501
    See application file for complete search history.

(56) References Cited

U.S. PATENT DOCUMENTS

| 5,339,461 A | * | 8/1994 | Luplow | 439/4 |
| 6,416,355 B1 | * | 7/2002 | Liao | 439/501 |
| 6,480,611 B1 | * | 11/2002 | Hashimoto et al. | 439/501 |
| 2002/0023814 A1 | * | 2/2002 | Poutiatine | 191/12.2 R |

FOREIGN PATENT DOCUMENTS

GB          2392900 A   *   3/2004

* cited by examiner

*Primary Examiner*—Tho D. Ta
(74) *Attorney, Agent, or Firm*—Jung-hua Kuo

(57) ABSTRACT

Cable winding devices and mechanisms for providing direct cable to electrical component connections without brush contacts are disclosed. Electronic controls may be provided directly on the cable winding device. The cable winding device generally includes two cable segments physically disconnected from each other, a spool configured for winding the cable segments thereon, and a circuit component such as a printed circuit board assembly that rotates with the spool. The circuit component may include electrical contacts to electronically connect corresponding pairs of wires of the cable segments and a user-adjustable or user-actuatable electronic control in communication with the electrical contacts. The circuit component may provide a pair of electrical contacts for each corresponding pair of wires in the cable segments and the electronic control is in communication with at least one pair of the electrical contacts. The cable segments form a continuous electrical path through a circuit component with electronic controls.

30 Claims, 3 Drawing Sheets

CABLE WINDING DEVICE WITH DIRECT CABLE TO ELECTRICAL COMPONENT CONNECTION

BACKGROUND OF THE INVENTION

1. Field of the Invention

The present invention relates generally to cord winding devices. More specifically, cable winding devices and mechanisms for providing direct cable to electrical component connections without brush contacts are disclosed.

2. Description of Related Art

Cable or cord winding devices employing various cable winding mechanisms have been proposed and commercialized for winding various cables such as telephone cables, power cords, and the like. Cable winding devices are often provided for convenience, safety, ease of use, and/or to prevent entanglement of the cable itself and/or with other cables or objects. Cables are typically wound onto one or more take-up reels of the cable winding device.

One example of a cable winding mechanism often used for telephone cables employs a pair of mid-cable take-up reels or spools positioned near the midpoint of the cable from which the take-up reels wind up the opposite segments of the cable. The midpoint of the telephone cable is secured between the two take-up reels that may share a common torsional spring drive or power spring drive so as to enable the opposite segments of the cable to be wound about the two take-up reels. The reel mechanism is thus located at approximately the midpoint of the cable and the cable extends approximately equally from each of the two reels.

Another example of a cable winding mechanism is a single take-up reel or spool positioned near the end of a cable to be wound onto the take-up reel. The take-up reel can be coupled to a torsional spring drive to facilitate in winding the cable about the reel or spool. The single take-up reel mechanism is thus located at approximately the end of the cable to be wound.

In certain applications such as in telephone applications, it may be desirable to provide electronics and/or electronic controls on the cable winding device. A printed circuit board assembly (PCBA) containing the electronics and/or electronic controls may be provided within the cable winding device. Brush contacts may be used to provide the electrical connection between the cable and the electronics on the PCBA. For example, the cable may be broken into two segments. One segment of the cable entering the cable winding device can be wired directly to the PCBA and is not to be wound by cable winding device. The other segment of the cable that is to be wound by the cable winding device can be attached to the spool and electrically connected to the PCBA via brush contacts. Each brush contact may correspond to a circular contact ring provided on the PCBA such that each brush contact is in constant contact with the corresponding circular contact ring. In addition, when the cable is being wound onto or unwound from the cable winding device, each brush contact travels in a circular direction along the corresponding circular contact ring such that the two cable segments form continuous electrical paths from one cable segment to the other via the PCBA.

However, such constant contact between the brush contacts and the circular contact rings results in the brush contacts rubbing against the corresponding circular contact ring each time the cable is wound or unwound. Thus the brush contacts may have a shorter cycle life and may be less reliable than a direct connection to a circuit component or PCB. Brush contacts are also relatively expensive.

In addition, depending on the particular application and the number of wires contained in the cable, a relatively large number of contact rings and brush contacts may need to be provided on the PCBA and the cable, respectively. A large number of contact rings and brush contacts not only increases the cost of the cable winding device but may also necessitate a larger PCBA and thus a larger cable winding device in order to provide the area needed for the desired number of contact rings. Thus, it would be desirable to provide a mechanism for a cost effective and reliable electrical connection between a cable and the PCBA on a cable winding device.

SUMMARY OF THE INVENTION

Cable winding devices and mechanisms for providing direct cable to electrical component connections without brush contacts are disclosed. It should be appreciated that the present invention can be implemented in numerous ways, including as a process, an apparatus, a system, a device, or a method. Several inventive embodiments of the present invention are described below.

Electronic controls, such as call answer/end, on/off, mute, volume, play/stop, rewind/fast forward control, dial control for selection options, and/or enter/accept control, may be provided directly on the cable winding device. The cable winding device generally includes two cable segments, a spool configured for winding the cable segments thereon, and a circuit component such as a printed circuit board assembly (PCBA) that rotates with the spool. The circuit component may include electrical contacts to electronically connect corresponding pairs of wires of the cable segments and a user-adjustable or user-actuatable electronic control in communication with the electrical contacts. The circuit component may provide a pair of electrical contacts for each corresponding pair of wires in the cable segments and the electronic control is in communication with at least one pair of the electrical contacts.

The spool may be a single mid-cable take-up spool or a pair of mid-cable take-up spools. The circuit component may be coupled to the spool via, for example, connection pins provided on the spool that cooperate with corresponding openings defined in the circuit component. The spool can provide a strain relieving cable housing configured to relieve strain exerted on the cable segments from forces applied to the cable segments such as at the headset and/or jack end of cable segments and thus protect the electronic connections from such strains. For example, the strain relieving cable housing may include a knot compartment for constraining a knot formed in each cable segment adjacent the electronic connection. The strain relieving cable housing may additionally or alternatively include a cable path or labyrinth. The cable path may correspond to each knot to facilitate in constraining the knot within the corresponding knot compartment.

The cable winding device may be incorporated in a headset system in which a headset includes a speaker and/or a microphone. One segment of the cable may be coupled to the headset while the other segment of the cable may be coupled to a base unit such as a telephone.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Cable winding devices and mechanisms for providing direct cable to electrical component connections without brush contacts are disclosed. The examples of cable winding devices described herein may be utilized in audio headset applications such as telephone headsets, audio listening headsets, and other personal listening devices. However, it is to be understood that the cable winding devices and mechanisms described herein may be similarly applied to various other applications such as power cords for household appliances, cables associated with peripherals (e.g., keyboard, mouse, speaker, etc.) for electronic devices such as computer, personal digital assistant (PDA), cellular telephones, sound recording device, and the like. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In certain applications such as in telephone and/or other audio listening headset applications, it may be desirable to provide electronics and/or electronic controls directly on a cable winding device 10. Examples of electronic controls include call answer/end, on/off control, mute control, volume control, play/stop, rewind/fast forward, dial control for selection options, enter/accept control etc. The provision of such electronic controls directly on the cable winding device 10 allows easy and convenient access to those controls by the user and thus may improve the ease of use of the apparatus for which the cable winding device supports such as a headset.

Figure 1:
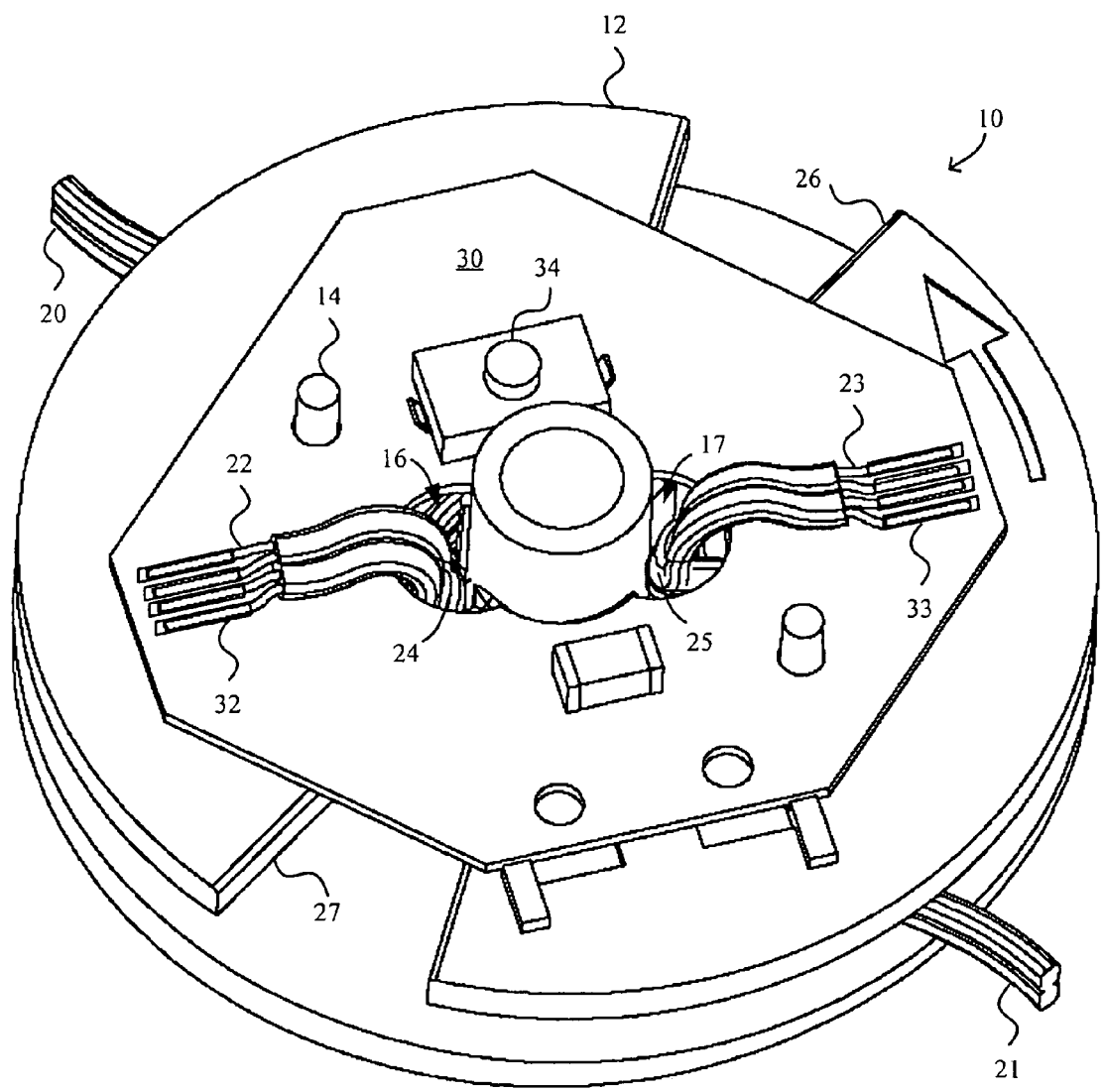
FIG. 1 is a perspective view of an exemplary cable winding device and mechanism for providing direct electrical connections between cable segments and electrical contacts such as those provided on a printed circuit board assembly (PCBA).
Figure 2:
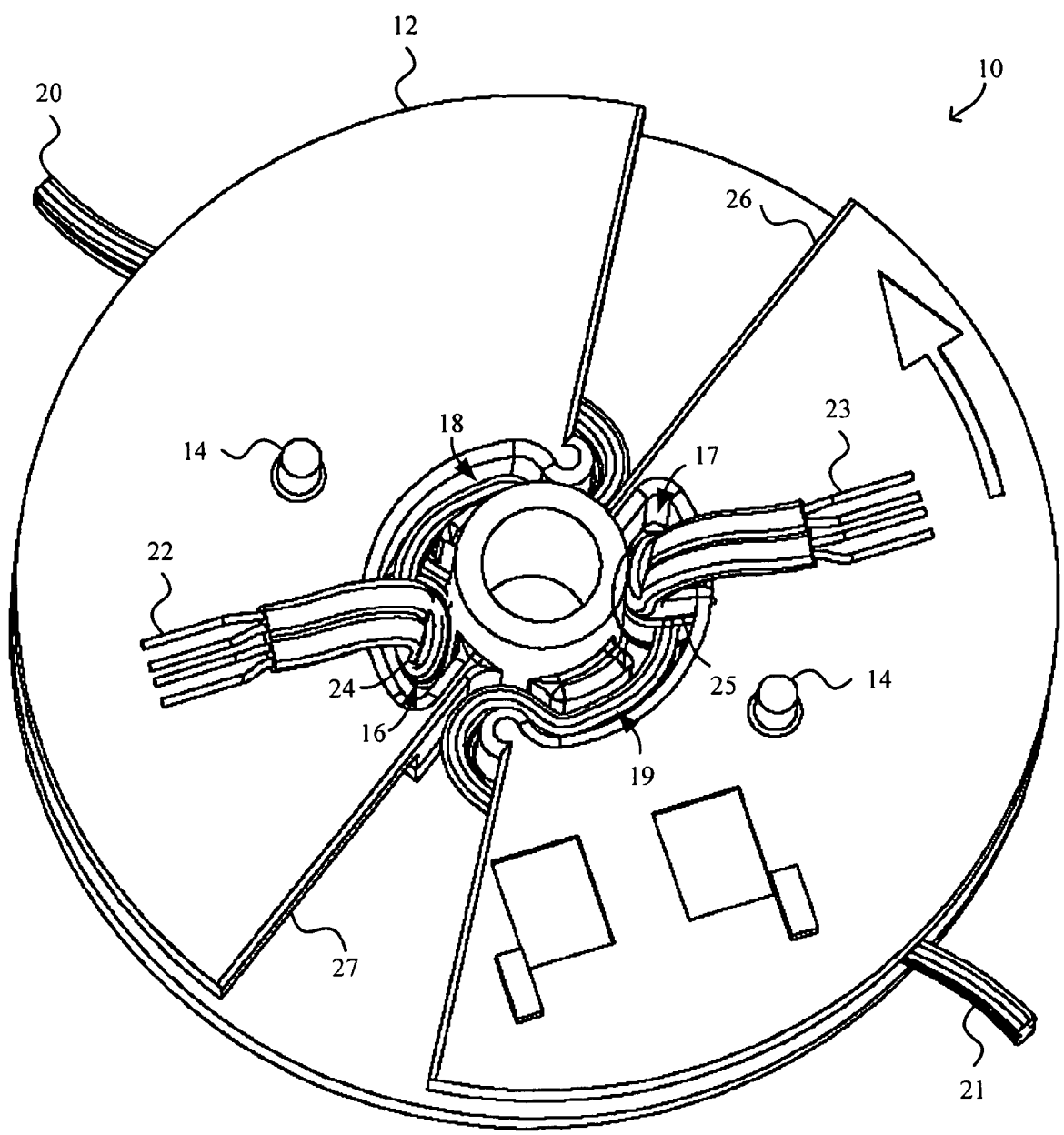
FIG. 2 is a perspective view of the exemplary cable winding device and mechanism of FIG. 1 shown without the PCBA for purposes of clarity and for illustrating various aspects of the spool and cable segments in more detail.

An exemplary cable winding device 10 having such electronic controls is shown in FIGS. 1 and 2. In particular, FIG. 1 is a perspective view of an exemplary cable winding device 10 and mechanism for providing direct electrical connections between cable segments 20, 21 to be wound onto or unwound from a spool 12 of the cable winding device 10 and various electrical contacts 32 or components such as those provided on a printed circuit board assembly (PCBA) 30. FIG. 2 is a perspective view of the exemplary cable winding device 10 and mechanism of FIG. 1 shown without the PCBA 30 for purposes of clarity and for illustrating various aspects of the spool and cable segments 20, 21 in more detail. In both FIGS. 1 and 2, an exterior housing of the cable winding device 10 is not shown for purposes of clarity. An axial pin or spindle (not shown) may extend from an interior surface of the exterior housing to support the rotation of the spool 12. In addition, a torsional or power spring drive (not shown) may be coupled to the spool 12 to facilitate rotation of the spool 12 and thus winding and/or unwinding of the cable segments 20, 21.

The two cable segments 20, 21 are physically disconnected from each other but form a continuous electrical path. The spool 12 of the cable winding device 10 is a mid-cable take-up spool positioned between the two cable segments 20, 21 onto which the cable segments 20, 21 are wound. Each of the cable segments 20, 21 can be simultaneously wound or unwound from the spool 12. The cable segments 20, 21 thus extend approximately equally in length from the spool 12. Although the exemplary cable winding device 10 is shown and described herein as having only one mid-cable take-up spool 12, the cable winding device 10 may similarly employ a take-up spool for each segment 20, 21 of the cable.

As shown in FIG. 1, each cable segment 20, 21 terminates within the take-up spool 12 at direct electrical connections between terminal wires 22, 23 of the cable segments 20, 21 and the electrical contacts or soldering pad 32, 33 on the PCBA 30, respectively. The direct electrical connections may be provided, for example, by soldering each of the one or more terminal wires 22, 23 to a corresponding electrical contact 32, 33 on the PCBA 30. The PCBA 30 is secured to the spool 12 such that the PCBA rotates with the spool 12. For example, connection pins or posts 14 may be provided on and extend from the spool 12 through which corresponding openings 36 provided on the PCBA 30 may be positioned for ease of assembly and to facilitate the coupling of the PCBA 30 to the spool 12. The connection posts 14 may be molded features of the spool 12. Heat may be applied to at least partially melt the connection posts 14 to heat stake the PCBA 30 to the spool 12. Various alternative or additional mechanisms for coupling the PCBA 30 to the spool 12, e.g., adhesives, mechanical fasteners and the like, may be additionally or alternatively employed. The direct electrical connections eliminate any need for brush contacts and corresponding circular contact rings on the PCBA 30 and thus provide a more cost effective and more reliable electrical connection.

To ensure secure electrical connections between the terminal wires 22, 23 and the electrical contact 32, 33, the end of each cable segment 20, 21 adjacent the terminal wires 22, 23 may be strain-relieved. Strain-relieving ensures that any strain imposed on the cable segments 20, 21, such as resulting from the winding and unwinding of the cable segments 20, 21 onto and off of the spool 12, is not passed on or transferred to the electrical connections. Merely as an example, the spool 12 may define a strain relieving cable housing that includes knot compartments 16, 17 and narrower cable paths or labyrinths 18, 19 to house the strain-relieving portions of the cable segments 20, 21. In particular, each cable segment 20, 21 may be knotted 24, 25 adjacent the terminal wires 22, 23 and the knots 24, 25 may be constrained to within the knot compartments 16, 17 of the spool 12. Beyond the knot compartments 16, 17, the cable segments 20, 21 may traverse through the narrower cable paths 18, 19 configured such that the knots 24, 25 are too large and thus are blocked from entering the narrower cable paths 18, 19. The combination of the knots 24, 25 and the narrower cable paths 18, 19 to constrain the knots 24, 25 ensures that any strain imposed on the cable segments 20, 21 is transferred to the cable knots 24, 25. As such, little, if any, strain is transferred beyond the knots 24, 25 to the electrical connections. Extending beyond the narrower cable paths 18, 19, the cable segments 20, 21 may be fed through spool openings 26, 27 and onto the hub of the spool 12.

Various other strain relieving mechanisms may additionally or alternatively be employed. For example, a narrow labyrinth path may be provided without the knot compartment or the knots on the cable segments. Such a narrow labyrinth path may provide more and/or sharper turns and/or greater friction between the cable segments and the spool so as to provide sufficient strain relief. As another example, metal crimps instead of or in addition to the cable knots may also be used to provide strain relief.

Because both cable segments 20, 21 are soldered directly onto the electrical contacts 32, 33 provided on the PCBA 30 that is coupled to and rotates with the spool 12 and because of the strain relief provided, the electrical connections experience little, if any, straining force resulting from the winding and unwinding of the cable segments 20, 21. Thus, continuous electrical paths from one cable segment 20 (or 21) to the other cable segment 21 (or 20) via the electrical connections and the PCBA 30 are reliably established. The PCBA 30 may provide one or more desired user-actuatable or user-adjustable electrical controls 34 such as call answer/end, on/off, mute control, volume control, play/stop, rewind/fast forward control, dial control for selection options, enter/accept control, etc. Each electrical control 34 may be configured as a button, switch, dial, etc. Various other electrical components may also be provided on the PCBA 30. For example, a portion or an entire face of the cable winding device may be made to spin with the spool and PCBA, allowing the use of various other or additional electronic control interfaces such as dials, numerical keypads, momentary switches, and slide switches.

Figure 3:
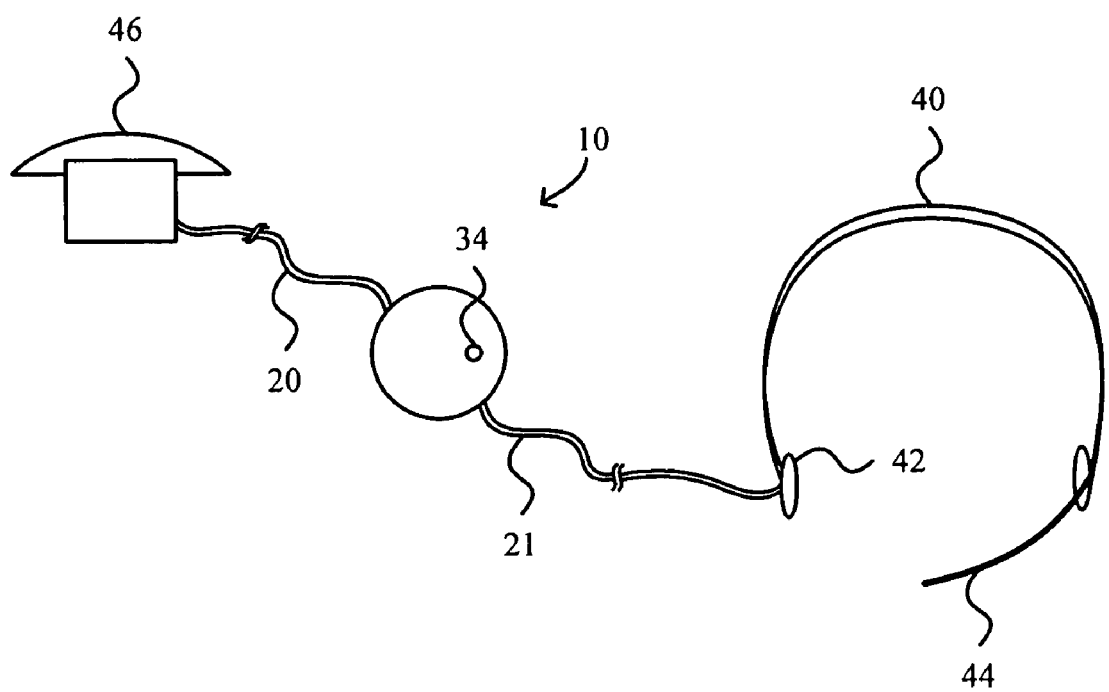
FIG. 3 is a block diagram illustrating the cable winding device as used between a headset and a base telephone.

As noted, the cable winding device 10 may be used in audio headset applications such as telephone headsets, audio listening headsets, and other personal listening devices such as shown in FIG. 3. As shown, one segment 21 of the cable may be coupled to a headset 40 containing a speaker only or a speaker 42 and a microphone 44 while the other segment 20 of the cable may be configured to be coupled a base unit such as a base telephone 46 or other base electronic device.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A cable winding apparatus, comprising:
   a cable including two cable segments;
   a spool configured to rotate for winding the cable segments thereon; and
   a circuit component configured to rotate with the spool, the circuit component including:
      a pair of electrical contacts configured to provide an electrical path therebetween, each cable segment being electrically coupled to a corresponding one of the electrical contacts via an electronic connection; and
      an electronic control in communication with the electrical contacts, the electronic control being one of user-adjustable and user-actuatable.

2. The cable winding apparatus of claim 1, wherein the circuit component is a printed circuit board.

3. The cable winding apparatus of claim 1, wherein the electronic connection is via at least one of a solder joint and a mechanical connection.

4. The cable winding apparatus of claim 1, wherein the spool provides connection pins to cooperate with corresponding openings defined in the circuit component for coupling the circuit component to the spool.

5. The cable winding apparatus of claim 1, wherein each cable segment includes a plurality of wires, the circuit component being configured to provide a pair of electrical contacts for each corresponding pair of wires in the two cable segments, the electronic control being in communication with at least one of the pairs of the electrical contacts.

6. The cable winding apparatus of claim 1, wherein the electronic control is selected from the group consisting of a call answer/end control, on/off control, mute control, volume control, play/stop control, rewind/fast forward control, dial control for selection options, and enter/accept control.

7. The cable winding apparatus of claim 1, wherein the spool is one of a single mid-cable take-up spool and a pair of mid-cable take-up spools.

8. The cable winding apparatus of claim 1, further comprising:
   a housing that houses the spool and the circuit component; and
   an electronic control interface disposed on an external face of the housing and configured to interface with the electronic control, the electronic control interface and at least a portion of the external face of the housing being further configured to rotate with the spool and the circuit component.

9. The cable winding apparatus of claim 8, wherein the electronic control interface is selected from the group consisting of a dial keypad, momentary switch, and slide switch.

10. The cable winding apparatus of claim 1, wherein the spool provides a strain relieving cable housing configured to relieve strain exerted on the cable segments from being exerted on the electronic connections.

11. The cable winding apparatus of claim 10, further comprising crimps, wherein each cable segment is crimped adjacent the electronic connection using one of the crimps, each crimp being housed in the strain relieving cable housing.

12. The cable winding apparatus of claim 10, wherein the strain relieving cable housing includes a cable labyrinth.

13. The cable winding apparatus of claim 10, wherein each cable segment is and formed into a knot adjacent the electronic connection and wherein the strain relieving cable housing includes a knot compartment corresponding to each cable knot for housing the corresponding cable knot therein.

14. The cable winding apparatus of claim 13, wherein the strain relieving cable housing further includes a cable path corresponding to each knot and configured to constrain the knot within the corresponding knot compartment.

15. A headset system, comprising:
   a headset including a speaker; and
   a cable winding apparatus including:
      a cable including a first cable segment configured to be coupled to the headset and a second cable segment;

a spool configured to rotate for winding the cable segments thereon; and a circuit component configured to rotate with the spool, the circuit component including:

a pair of electrical contacts configured to provide an electrical path therebetween, each cable segment being electrically coupled to a corresponding one of the electrical contacts via an electronic connection; and an electronic control in communication with the electrical contacts, the electronic control being one of user-adjustable and user-actuatable.

16. The headset system of claim 15, wherein the circuit component is a printed circuit board.

17. The headset system of claim 15, wherein the spool provides connection pins to cooperate with corresponding openings defined in the circuit component for coupling the circuit component to the spool.

18. The headset system of claim 15, wherein each cable segment includes a plurality of wires, the circuit component being configured to provide a pair of electrical contacts for each corresponding pair of wires in the two cable segments, the electronic control being in communication with at least one of the pairs of the electrical contacts.

19. The headset system of claim 15, wherein the electronic control is selected from the group consisting of a call answer/end control, on/off control, mute control, volume control, play/stop control, rewind/fast forward control, dial control for selection options, and enter/accept control.

20. The headset system of claim 15, wherein the spool is one of a single mid-cable take-up spool and a pair of mid-cable take-up spools.

21. The headset system of claim 15, wherein the cable winding apparatus further includes:

a housing that houses the spool and the circuit component; and an electronic control interface disposed on an external face of the housing and configured to interface with the electronic control, the electronic control interface and at least a portion of the external face of the housing being further configured to rotate with the spool and the circuit component.

22. The headset system of claim 21, wherein the electronic control interface is selected from the group consisting of a dial, keypad, momentary switch, and slide switch.

23. The headset system of claim 15, wherein the spool provides a strain relieving cable housing configured to relieve strain exerted on the cable segments from being exerted on the electronic connections.

24. The headset system of claim 23, further comprising crimps, wherein each cable segment is crimped adjacent the electronic connection using one of the crimps, each crimp being housed in the stain relieving cable housing.

25. The headset system of claim 23, wherein the strain relieving cable housing includes a cable labyrinth.

26. The headset system of claim 23, wherein each cable segment is formed into a knot adjacent the electronic connection and wherein the strain relieving cable housing includes a knot compartment corresponding to each cable knot for housing the corresponding cable knot therein.

27. The headset system of claim 26, wherein the strain relieving cable housing further includes a cable path corresponding to each knot and configured to constrain the knot within the corresponding knot compartment.

28. A cable winding apparatus, comprising:

a first electronic wire means;

a second electronic wire means;

a spooling means for winding the first and second electronic wire means thereon; and a electronic signal conditioning means for conditioning electronic signals, the electronic signal conditioning means being rotatable with the spool means and including:

a pair of electrical contact means for providing an electrical path therebetween, each electronic wire means being electrically coupled to a corresponding one of the electrical contact means via an electronic connecting means; and an electronic control means in communication with the electrical contacts means, the electronic control means being one of user-adjustable and user-actuatable, the conditioning of the electronic signals being in response to the electronic control means.

29. The cable winding apparatus of claim 28, wherein the spooling means includes a strain relieving means for relieving strain exerted on the first and second electronic wire means from being exerted on the electronic connecting means.

30. The cable winding apparatus of claim 28, further comprising:

housing means for housing the spooling means and the electronic signal conditioning means; and electronic control interfacing means for interfacing with the electronic control means, the electronic control interfacing means being disposed on an external face of the housing means, the electronic control interfacing means and at least a portion of the external face of the housing means being further configured to rotate with the spooling means and the electronic signal conditioning means.

* * * * *